United States Patent [19]
Hoshi

[11] Patent Number: 5,869,991
[45] Date of Patent: Feb. 9, 1999

[54] AUTOMATIC RUNAWAY DETECTOR AND RESET CIRCUIT

[75] Inventor: Takaaki Hoshi, Ibaraki, Japan

[73] Assignee: Matsushita Electric Iddustrial Co., Ltd., Osaka, Japan

[21] Appl. No.: 870,340

[22] Filed: Jun. 6, 1997

[30] Foreign Application Priority Data

Jun. 17, 1996 [JP] Japan ................................. 8-155132

[51] Int. Cl.$^6$ ....................................................... H03L 7/00
[52] U.S. Cl. ........................................... 327/142; 327/198
[58] Field of Search ................................... 327/142, 143, 327/198

[56] References Cited

U.S. PATENT DOCUMENTS 5,576,650  11/1996  Hirotani et al. ........................ 327/142

FOREIGN PATENT DOCUMENTS 2-65565   3/1990  Japan.
2-176917  7/1990  Japan.

Primary Examiner—Timothy P. Callahan
Assistant Examiner—Jeffrey Zweizig
Attorney, Agent, or Firm—Ratner & Prestia

[57] ABSTRACT

A circuit prevents continuation of a runaway condition in a micro-controller. When the output terminal in a C-MOS push-pull structure of the micro-controller becomes uncontrollable as a result of runaway of the micro-controller, the usually low potential of the output terminal elevates, and is used as detection signal. The detection signal is applied to the base of a detection transistor to conduct the detection transistor, resulting in the voltage of the reset terminal of the micro-controller, which is connected to the collector of the detection transistor, to become a "LOW" level to stop the runaway condition. The port terminal voltage is set to a "LOW" level based on the change of the reset terminal voltage which conducts the diode connected between the port terminal and the base of the detection transistor, thereby lowering the base potential of the transistor and hence the control transistor is cut off. As a result, the reset terminal of the micro-controller is returned to the normal high potential, thereby resetting the micro-controller.

7 Claims, 2 Drawing Sheets

AUTOMATIC RUNAWAY DETECTOR AND RESET CIRCUIT

FIELD OF THE INVENTION

The present invention relates to a circuit for preventing a runaway condition of an IC including a microprocessor and its peripheral circuit (hereinafter called a micro-controller) in an electronic appliance.

BACKGROUND OF THE INVENTION

Hitherto, in a malfunction preventive circuit for a micro-controller used to control an electronic appliance, means to prevent malfunction due to program runaway of a micro-controller is proposed, for example, in Japanese Laid-open Patent H2-176917. This means is an automatic reset circuit using a counter. Further means for preventing malfunctions induced when spark discharge occurs in a cathode-ray tube is proposed, for example, in Japanese Laid-open Patent H2-65565. This means is a circuit using a monostable multivibrator, and is intended to prevent malfunction of the micro-controller.

The conventional means, however, corresponds only to malfunctions due to program runaway of the micro-controller, and is a circuit using a counter for continuously monitoring the program or is a circuit for preventing malfunction only for spark discharges taking place in a cathode-ray tube, and is not capable of preventing malfunctions due to runaway taking place in the micro-controller.

In the event of runaway of a micro-controller in a television, usually, the user notices an abnormality on the screen, such as incorrect display, disturbed picture, or skipping of channels due to runaway and can turn off the power switch. Or, if no abnormality appears on the screen, the user may notice the abnormality only when manipulating the keys of the television. In such a case, the micro-controller is tracking abnormal actions, and when this abnormal state continues, the micro-controller may break down.

Moreover, the conventional circuit comprises a counter, multivibrator and others, and the countermeasure circuit is complicated. Thus, it does not lend itself to simplifying the parts around the micro-controller, or for saving space on the printed wiring board, and lowering the cost.

SUMMARY OF THE INVENTION

An automatic reset circuit is intended to prevent the continuation of a runaway condition by detecting runaway of a micro-controller and then resetting the micro-controller. As a result, breakdown of the micro-controller may be prevented.

Constituent parts for composing this automatic reset circuit are chip parts such as transistors (or MOSFETS), diodes and resistors. As a result, simplifying the parts around the micro-controller, saving of space on the printed wiring board, and lowering of cost may be realized.

Furthermore, it is possible to build this automatic circuit in the micro-controller.

DESCRIPTION OF THE PREFERRED EMBODIMENTS

First Exemplary Embodiment

Figure 1:
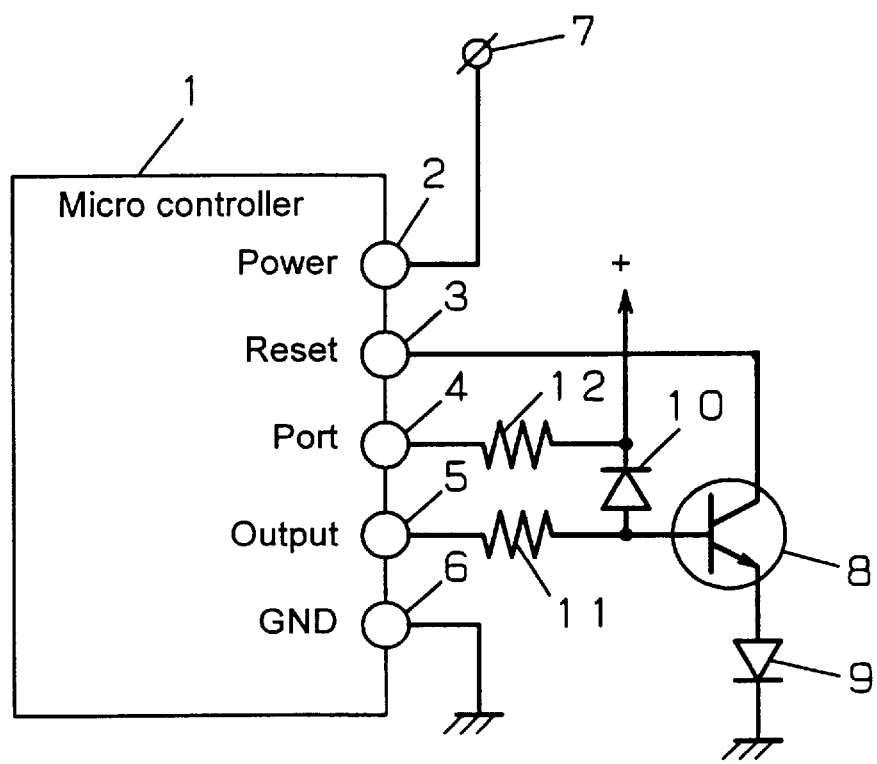
FIG. 1 is an automatic reset circuit diagram described in a first exemplary embodiment of the invention.

FIG. 1 shows an automatic reset circuit for preventing continuation of runaway of a micro-controller. In FIG. 1, when runaway occurs in a micro-controller 1, the potential of an output terminal 5 in the C-MOS push-pull structure is in an uncontrollable state, and the level of output terminal 5 is automatically elevated from the usual "LOW" output. By making use of the change in level of output terminal 5, the invention detects runaway of the micro-controller.

The output terminal 5 in the C-MOS push-pull structure is connected to the base of a detection transistor 8 (which serves as a detector) through a protective resistance 11 to guard against breakdown due to excessive current.

The emitter of the detection transistor 8 is connected to the anode of a malfunction preventive diode 9, and the cathode of the malfunction preventive diode 9 is grounded.

The collector of the detection transistor 8 is connected to a micro-controller reset terminal 3, and the base of the detection transistor 8 is connected to the anode of a diode 10. The cathode of the diode 10 is connected to a port terminal 4 through a protective resistance 12 which is used to guard against breakdown due to excessive current.

In this way, while the micro-controller 1 is functioning normally, the potential of output terminal 5 in the C-MOS push-pull structure is a "LOW" output. Once, however, runaway takes place in the micro-controller 1, the potential of the output terminal 5 is uncontrollable and is elevated automatically.

By automatic elevation of the potential of the output terminal 5, the base potential of the detection transistor 8 rises, and output transistor 8 conducts. The potential of the micro-controller reset terminal 3 is usually a "HIGH" level, but as a result of conduction of the transistor 8, it is pulled down to a "LOW" level. As the potential of the reset terminal 3 becomes "LOW", the runaway of the micro-controller 1 is stopped.

Consequently, after the micro-controller reset terminal potential is changed to "LOW", depending on the change of the reset terminal potential to "LOW", the port terminal 4 is pulled down to "LOW".

As the port terminal 4 is changed to "LOW", diode 10 (which serves as a detector) conducts, and the base potential of the detection transistor 8 descends again after a delay time occurring in the related circuits, such as protective resistance 12, and the parasitic capacitance of detection transistor 8. As a result, the collector and emitter of the detection transistor 8 are cut off, and the micro-controller reset terminal 3 returns to the usual "HIGH" potential.

In this manner, after the occurrence of runaway of micro-controller 1, the micro-controller reset terminal 3 changes from "HIGH" to "LOW" and back to "HIGH" potential by the action of the automatic reset circuit.

As the micro-controller reset terminal 3 returns to the high potential, the micro-controller is reset, and resumes normal function.

Thus by resetting the micro-controller, the micro-controller 1 can be cleared of the runaway condition, and restored to normal function.

The malfunction preventive diode 9 is provided in order to lower the base potential of the detection transistor 8 below 2 D (twice the PN junction forward voltage) so as to securely turn off the detection transistor 8 when the port terminal 4 becomes a "LOW" level, depending on the micro-controller reset terminal 3 and the conduction of diode 10.

Instead of the detection transistor 8 in FIG. 1, a MOSFET may also be used. Similarly, instead of diode 10, another unidirectional device may be used. Whether a resistor is used instead of the malfunction preventive diode 9, or the diode 9 is not used, it is possible to similarly devise the circuit. However, considering the forward potential characteristic between the base and emitter of the detection transistor 8, and the forward potential characteristic of the diode 10, it is required that the ON potential of diode 10 should be always lower than the base potential of the detection transistor 8 to properly turn on detection transistor 8. That is, when the potential of the port terminal 4 is "HIGH", diode 10 does not conduct, but when the potential of port terminal 4 is "LOW", the circuit may be composed so that diode 10 may conduct until the base potential of detection transistor 8 reaches the potential for cutting off detection transistor 8.

Moreover, constituent parts for composing this automatic reset circuit are all chip parts such as transistors, diodes and resistors, thereby simplifying the parts around the micro-controller. Thus, saving substrate space and lowering of cost can be realized.

Second Exemplary Embodiment

Figure 2:
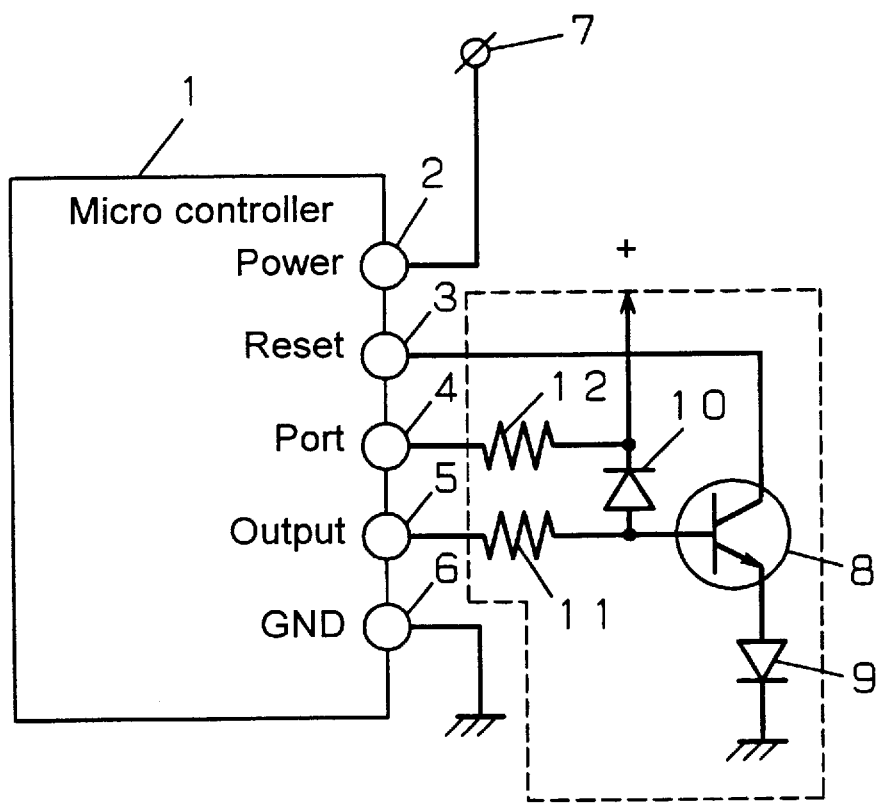
FIG. 2 is an automatic reset circuit diagram of a micro-controller incorporating a malfunction preventive function described in a second exemplary embodiment of the invention.

FIG. 2 shows a micro-controller incorporating an automatic reset circuit for preventing the continuation of a runaway condition of a micro-controller 1 (the portion excluding the incorporated automatic reset circuit from the micro-controller).

In FIG. 2, the broken line area indicates an incorporated reset circuit built into micro-controller 1. In FIG. 2, the potential of an output terminal 5 in the C-MOS push-pull structure is a "LOW" output in the normal state. When runaway occurs in the micro-controller 1, the potential of the output terminal 5 is uncontrollable and automatically elevates. By making use of this change, the invention detects a runaway condition of the micro-controller.

The output terminal 5 in the C-MOS push-pull structure is connected to the base of a detection transistor 8 through a protective resistance 11 to provide protection against breakdown due to excessive current.

The emitter of detection transistor 8 is connected to the anode of a malfunction preventive diode 9, and the cathode of the malfunction preventive diode 9 is grounded.

The collector of detection transistor 8 is connected to a micro-controller reset terminal 3, and the base of detection transistor 8 is connected to the anode of a diode 10. The cathode of diode 10 is connected to a port terminal 4 through a protective resistance 12 to provide protection against breakdown due to excessive current.

The potential of the output terminal 5 in the C-MOS push-pull structure is a "LOW" level output in the normal state, but once runaway takes place in micro-controller 1, the potential of the output terminal 5 is uncontrollable and is automatically elevated.

By automatic elevation of the potential of output terminal 5, the base potential of detection transistor 8 rises, and the collector and emitter of the output transistor 8 conduct with each other. The potential of the micro-controller reset terminal 3 is usually a "HIGH" level, but as a result of conduction of transistor 8, it is pulled down to a "LOW" level.

As the potential of the reset terminal 3 becomes "LOW", the runaway of micro-controller 1 is stopped.

Consequently, after the micro-controller reset terminal potential is changed to a "LOW" level, depending on the change of the reset terminal potential to a "LOW" level, the port terminal 4 is pulled down to a "LOW" level. As the port terminal 4 is changed to a "LOW" level, diode 10 conducts, and the base potential of detection transistor 8 descends again after a delay time occurring in the related circuits, such as protective resistance 12, and parasitic capacitance of detection transistor 8. As a result, the collector and emitter of the detection transistor 8 are cut off, and the micro-controller reset terminal 3 returns to the usual "HIGH" potential.

After the occurrence of runaway in micro-controller 1, the micro-controller reset terminal 3 changes from "HIGH" to "LOW" and back to "HIGH" potential by the action of the automatic reset circuit.

As the micro-controller reset terminal 3 returns to the "HIGH" potential, mnicro-controller 1 is reset, and resumes normal operation.

Thus by resetting micro-controller 1, micro-controller 1 can be cleared of runaway, and restored to normal operation.

The malfunction preventive diode 9 is provided in order to lower the base potential of the detection transistor 8 below 2 D, to securely turn off the detection transistor 8 when the port terminal 4 becomes a "LOW" level depending on the micro-controller reset terminal 3 and the conduction of diode 10.

Instead of the detection transistor in FIG. 1, a MOSFET may also be used. Whether a resistor is used instead of the malfunction preventive diode 9, or the diode 9 is not used, it is possible to similarly devise the circuit. In this case, however, considering the forward potential characteristic between the base and emitter of detection transistor 8, and the forward potential characteristic of diode 10, it is required that the ON potential of diode 10 should always be lower than the base potential of detection transistor 8 to properly turn on detection transistor 8. That is, when the port terminal potential is "HIGH", diode 10 does not conduct, but when the port terminal potential is "LOW", the circuit may be composed so that diode 10 may conduct until the base potential of detection transistor 8 reaches the potential for cutting off detection transistor 8.

Having the automatic reset circuit of such constitution inside the micro-controller, incorporating the malfunction preventive function can be realized.

Thus, the automatic reset circuit of the exemplary embodiment is a simple circuit around the micro-controller, and by constitution within the micro-controller, continuation of a runaway condition of micro-controller can be prevented. In this way the quality of the micro-controller or micro-controller applied electronic appliances can be assured at low cost.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. An automatic reset circuit for use with a microcontroller having a reset terminal and including a first detector which detects a runaway state occurring in said micro-controller and issues a first detection signal responsive to detecting said runaway state, said automatic reset circuit comprising:

a second detector for issuing a second detection signal responsive to the reset terminal being transitioned from a first potential to a second potential, and a reset control circuit for transitioning said reset terminal of said micro-controller from said first potential to said second potential responsive to said first detection signal and, responsive to said second detection signal, for transitioning said reset terminal back to said first potential.

2. An automatic reset circuit for use with a micro-controller having a reset terminal and a push-pull structure and including a detection circuit which detects a runaway state occurring in said micro-controller and issues a first detection signal responsive to said runaway state, said automatic reset circuit comprising:

a second detector for issuing a second detection signal responsive to the reset terminal being transitioned from a first potential to a second potential, and a reset control circuit for transitioning said reset terminal of said micro-controller from a first potential to a second potential responsive to said first detection signal and, responsive to said second detection signal, for transitioning said reset terminal back to said first potential.

3. An automatic reset circuit of claim 2, wherein a voltage of a further detector of said microcontroller is varied depending on the change of the potential of the reset terminal, and said voltage of said further detector is said second detection signal.

4. A micro-controller including an automatic reset circuit with a reset terminal, and a push-pull structure, said automatic reset circuit comprising:

a first detection circuit for i) detecting a runaway state of the micro-controller, and ii) issuing a first detection signal responsive to a change of potential of an output terminal of said push-pull structure, a second detection circuit for issuing a second detection signal responsive to the reset terminal being transitioned from a first potential to a second potential change of said reset terminal, and a reset control circuit for transitioning said reset terminal of said micro-controller from said first potential to said second potential responsive to said first detection signal and, responsive to said second detection signal, for transitioning said reset terminal back to said first potential.

5. A micro-controller including an automatic reset circuit of claim 4, wherein a voltage of a further detector is varied depending on the change of the potential of the reset terminal, and said voltage of said further detector is said second detection signal.

6. An automatic reset circuit for use with a microcontroller comprising:

a detector for detecting a first state in said microcontroller, first signal generating means for generating a first detection signal responsive to said detected first state of said microcontroller, control means for controlling a potential of a reset terminal of said microcontroller responsive to said first detection signal, and second signal generating means for generating a second detection signal based on the potential of said reset terminal of said microcontroller, wherein said potential of said reset terminal is i) changed from a first potential to a second potential responsive to said control means and ii) restored to the first potential by said second detection signal.

7. A method for automatically resetting a microcontroller comprising the steps of:

detecting a first state in said microcontroller, generating a first detection signal responsive to said detected first state of said microcontroller, controlling a potential of a reset terminal of said microcontroller responsive to said first detection signal, and generating a second detection signal based on the potential of said reset terminal of said microcontroller, wherein said potential of said reset terminal is i) changed from a first potential to a second potential responsive to said control means and ii) restored to the first potential by said second detection signal.

* * * * *

UNITED STATES PATENT AND TRADE MARK OFFICE
CERTIFICATE OF CORRECTION

PATENT NO.   : 5,869,991
DATED        : February 9, 1999
INVENTOR(S)  : Hoshi

It is certified that error appears in the above-identified patent and that said Letters Patent is hereby corrected as shown below:

Cover page, item [73] Assignee, delete "Matsushita Electric Iddustrial Co., Ltd." And insert --Matsushita Electric Industrial Co., Ltd.--

Signed and Sealed this

Thirtieth Day of November, 1999

Attest:

Q. TODD DICKINSON

*Attesting Officer*     *Acting Commissioner of Patents and Trademarks*